Mar. 6, 1923.

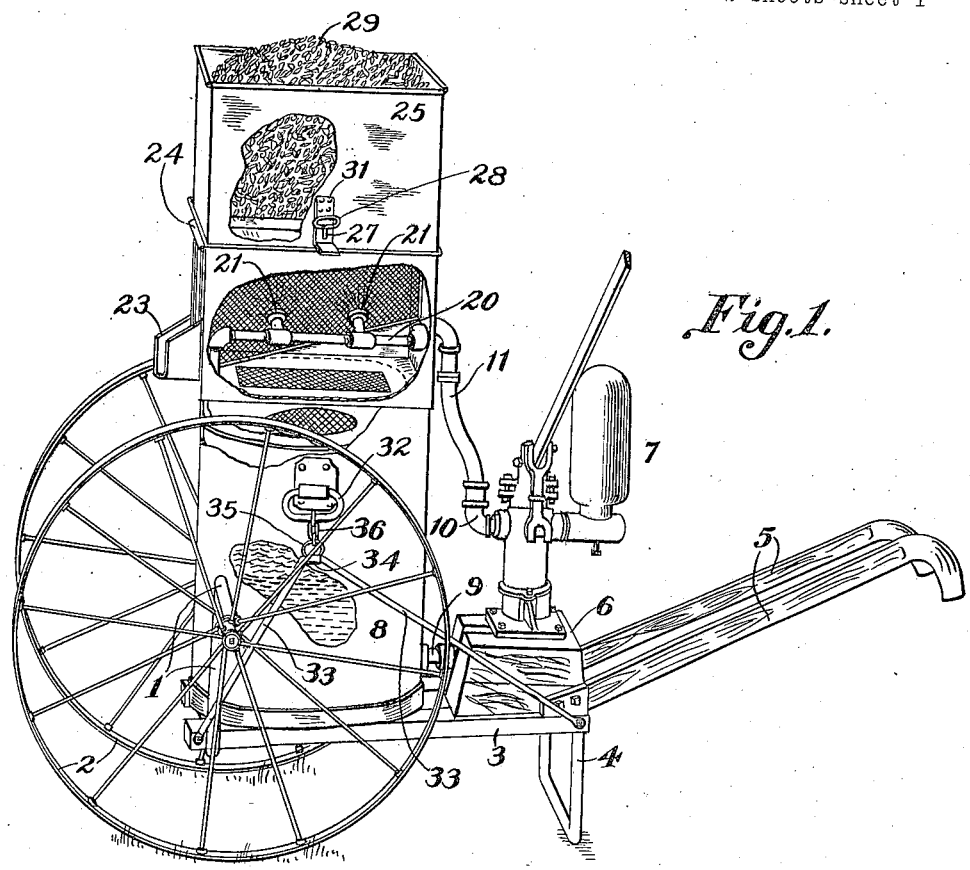

S. LARSON 1,447,874

COMBINATION SEED FUNGUS EXTERMINATOR AND SPRAYER

Filed Feb. 4, 1922

Inventor
Samuel Larson.
His Attorneys.

Patented Mar. 6, 1923.

1,447,874

UNITED STATES PATENT OFFICE.

SAMUEL LARSON, OF HINSDALE, ILLINOIS.

COMBINATION SEED-FUNGUS EXTERMINATOR AND SPRAYER.

Application filed February 4, 1922. Serial No. 534,189.

*To all whom it may concern:*

Be it known that I, SAMUEL LARSON, a citizen of the United States, residing at Hinsdale, in the county of Du Page and State of Illinois, have invented certain new and useful Improvements in Combination Seed-Fungus Exterminators and Sprayers, of which the following is a specification, reference being had therein to the accompanying drawings.

This invention relates to a combination seed fungus exterminator and sprayer, and the object of the invention is to produce a machine that can be used for treating seed, and also which can be used for spraying purposes, such as the spraying of fruit trees and, when desired, the machine can be used as a cart for transporting loads.

With this and other objects in view, my invention comprises certain novel combinations, constructions and arrangements of parts as will be hereinafter described, illustrated in the accompanying drawings, and more particularly pointed out in the appended claims.

In the drawings:

Figure 1 is a perspective view, partly in section, of a machine constructed in accordance with the present invention, and used for the treatment or fumigation of seed.

Figure 2 is a view, in side elevation, of the machine when it is used as a cart, or in place of a wheelbarrow.

Figure 3:
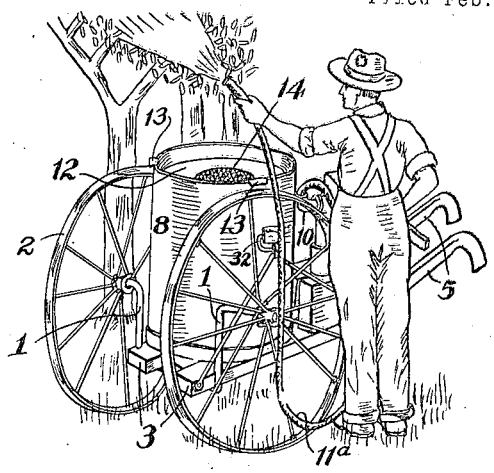
Figure 3 is a perspective view, showing the machine used as a sprayer, for spraying fruit trees of various kinds.

Referring to the drawings by numerals, 1 designates a substantially U-shaped axle frame, on the ends of which are journaled wheels 2. The inner ends of horizontal beams 3 are suitably secured to the axle frame 1 in any ordinary manner, and a substantially U-shaped rest frame 4 is fastened to the outer ends of beams 3. Handles 5 are fastened to the outer ends of beams 3. A platform 6 is placed upon the beams 3 near the handles 5, and amounted upon platform 6 is pump 7. As shown in Fig. 2, the wheeled structure constituted by the axle frame 1, wheels 2, beams 3 and handles 5, may readily be used as a cart or as a wheelbarrow, for conveying a load.

The tank 8 is placed upon the beams 3, between the wheels 2, and the pipe 9 suitably connects the tank 8 with pump 7 in any ordinary manner, so that liquid contained in tank 8 can be pumped through the connecting elbow 10 of the pump, and either forced through the connecting hose of pipe 11, Fig. 1, or the spraying hose 11$^a$, Fig. 3, at the will of the operator.

The auxiliary screen-casing 12 is detachably supported upon the upper edge of tank 8 by ears 13, Figs. 3 and 5, and in the center of the auxiliary screen-casing 12 is screen 14, for the purpose hereinafter described.

Figure 5:
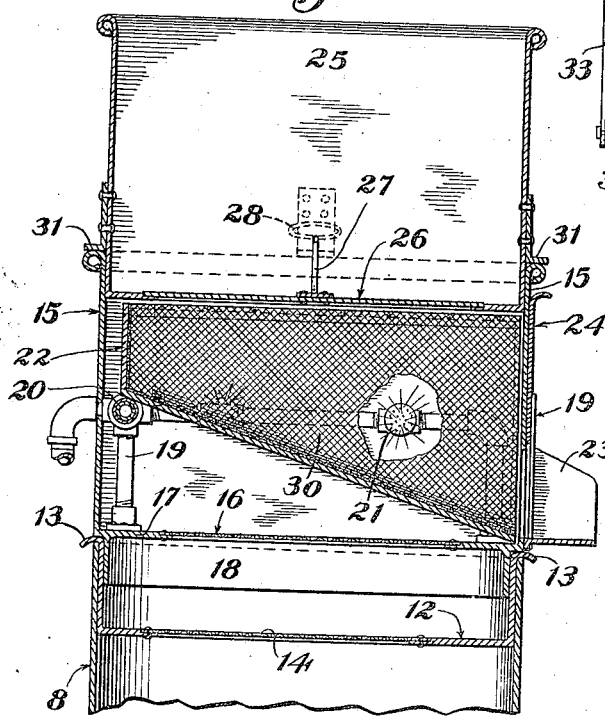
Figure 5 is an enlarged, sectional view, taken on line 5—5, Fig. 4, and looking in the direction of the arrows.
Figure 6:
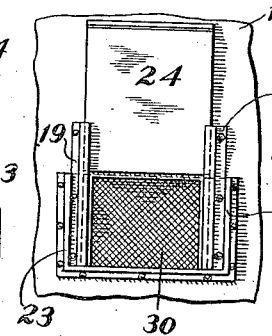
Figure 6 is a fragmentary, front view of the primary screen-casing, showing the chute and the slide-door.

The primary screen-casing 15 has a screen 16 in its bottom 17, and the depending flange portion 18, of casing 15, extends into the screen-casing 12, Fig. 5. Secured to the bottom 17, of casing 15, are vertical brackets 19, and supported by brackets 19, is a substantially U-shaped pipe 20 that is provided at opposite sides with spraying nozzles 21. Positioned between nozzles 21 is an inclined screen 22, which screen 22 has its rear end resting upon the pipe 20, and its front end is positioned so as to allow seed to be discharged through spout 23. The spout 23 is normally closed by a slide-door 24.

Figure 4:
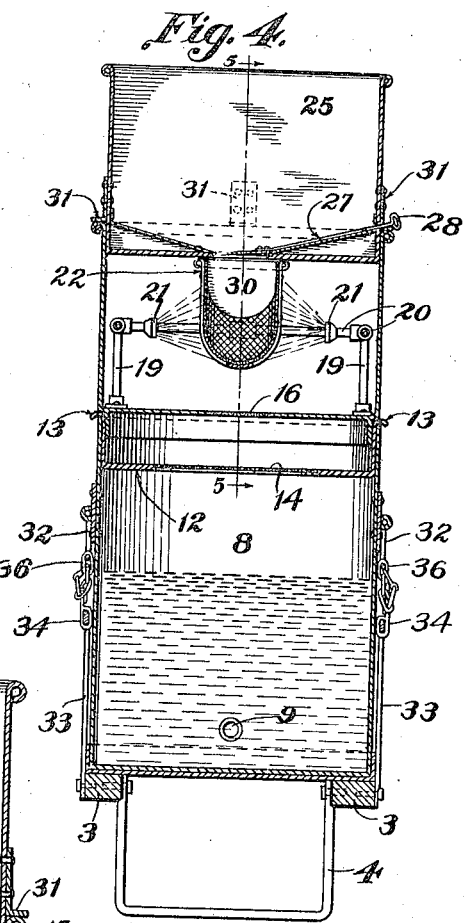
Figure 4 is a transverse, vertical, sectional view of the tank, screen-casing and hopper, while

A detachable hopper 25 is positioned within the upper portion of primary screen-casing 15, and this hopper is provided with a sliding valve 26, to which is connected rod 27; rod 27 extends through one side of hopper 25 and is provided with a suitable grip 28, whereby the operator can readily control the amount of seed 29 (Fig. 1) passing from the hopper into the screen 22; while operating the pump, the formaldehyde will be sprayed through nozzles 21 against the seed in the chamber 30 of screen 22, Fig. 4, and superfluous liquid will drain from the seeds through the screen 22, and before passing into tank 8, the liquid will be further "screened" or "strained" by passing through the second screen 16, thereby making the liquid comparatively pure and eliminating stopping or clogging of the pump or the nozzles.

The hopper 25 is furnished with angle brackets 31 that engage the upper end of the primary screen-casing 15, and it is through one of these angle brackets 31 that rod 27 extends so as to produce a stronger structure, as the continued use of the rod in adjusting the slide valve 26 will not wear a large hole in the hopper 25, as would be the case if the hole for rod 27 was made only in the thin metal of which the hopper is constructed.

The tank 8 is provided with link hand holds 32, and substantially V-shaped brackets 33 are fastened at the ends to the beams 3, Fig. 1, and on the upper portions of brackets 33 are sleeves 34, in which links 35 are mounted, and the links 32 and 35 are connected by chain 36. The tank can be quickly removed from beams 3 by merely detaching the chains 36, or, by removing the brackets 33, the tank and brackets can all be removed, as shown in Fig. 2.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In a machine of the class described, the combination with a support, of a tank on said support, a casing containing a screen on said tank, a hopper on the casing and discharging into said screen, and means contiguous to the screen and adapted to spray or discharge a liquid on the screen for treating seeds while in the screen.

2. In a machine of the class described, the combination with a support, of a tank on said support, an auxiliary screen-casing on said tank, a primary screen-casing on said auxiliary screen-casing, a screen in said primary screen-casing, a hopper on said primary screen-casing and discharging into said screen, and means for spraying a liquid for treating seeds while retained in the screen.

3. In a machine of the class described, the combination of a support, of a tank on said support, an auxiliary screen-casing in the top of said tank provided with ears resting on the top edge of the tank, a primary screen-casing extending down into the auxiliary screen-casing and resting on said ears, a hopper extending into the tip of the primary screen-casing, angle brackets on the side of the hopper and engaging the top edge of the primary screen-casing, a screen in the primary screen-casing under the hopper, means on the hopper for controlling the amount of seeds discharged upon said screen, and spraying means around the screen for treating seeds in the screen.

4. In a machine of the class described, the combination with a support, of a tank on said support, a casing carried by said tank, a U-shaped pipe in said casing, nozzles on said pipe, and means for holding the seeds between said nozzles for permitting the spraying of the seeds through the medium of the nozzles.

5. In a machine of the class described, the combination with a support, of a tank on said support, a casing on said tank, vertical brackets carried by said casing, a horizontal, U-shaped pipe supported upon said brackets, nozzles on said pipe at opposite sides thereof, a screen supported between said nozzles, means for discharging seeds into said screen, and means for forcing liquid of a fumigant through the pipe and nozzles against and into said screen.

6. In a machine of the class described, the combination with a support, of a tank carried by said support, a casing on said tank, a pipe supported in said casing, nozzles on said pipe, said casing provided with a spout, an inclined screen resting at one end upon the pipe and discharging at its other end upon the spout, said nozzles discharging upon the screen, and means for forcing liquid from the tank through the pipe and nozzles against and into said screen.

7. In a machine of the class described, the combination with a support, of a tank carried by said support, a casing positioned upon the upper end of said tank, said casing provided with a screen in its bottom, a pipe provided at opposite sides of the casing with nozzles, a seed-holding screen positioned between the nozzles and resting upon the pipe and discharging at one end through one side of the casing, means for supplying seeds to said seed-holding screen, and means for forcing liquid from the tank through the pipe and the nozzles upon and into the seed-holding screen.

8. In a machine of the class described, the combination with a support, of a tank on said support, a screen-containing casing on said tank, a hopper having an opening in its bottom on said casing, a slide valve in the hopper for closing said casing, a rod connected to said slide valve and extending through the side of the hopper, and means for supplying liquid from the tank to the screen-containing casing.

9. In a machine of the class described, the combination with a support, of a casing carried by said support, a seed-holding screen in said casing, a hopper provided with angle brackets on its sides resting upon said casing, said hopper provided with a slide valve for controlling the discharge of seeds into said seed-holding screen, a rod in said hopper connected at its inner end to said slide valve and extending through the hopper and one of the angle brackets, said rod provided at its outer end with a grip, and means for supplying liquid to the seed-holding screen.

In testimony whereof I hereunto affix my signature.

SAMUEL LARSON.